(12) United States Patent
Letts

(10) Patent No.: US 11,008,666 B2
(45) Date of Patent: May 18, 2021

(54) PLASMA FREQUENCY TRIGGER

(71) Applicant: IH IP Holdings Limited, St. Helier (GB)

(72) Inventor: Dennis G. Letts, Austin, TX (US)

(73) Assignee: IH IP Holdings Limited, Jersey (GB)

( * ) Notice: Subject to any disclaimer, the term of this patent is extended or adjusted under 35 U.S.C. 154(b) by 0 days.

(21) Appl. No.: 16/365,950

(22) Filed: Mar. 27, 2019

(65) Prior Publication Data

US 2019/0218681 A1 Jul. 18, 2019

Related U.S. Application Data

(62) Division of application No. 15/615,167, filed on Jun. 6, 2017, now Pat. No. 10,385,468.

(Continued)

(51) Int. Cl.
  *C25D 3/56* (2006.01)
  *C25D 7/04* (2006.01)
  (Continued)

(52) U.S. Cl.
  CPC .............. *C25D 3/56* (2013.01); *C25D 5/10* (2013.01); *C25D 7/04* (2013.01); *G21B 3/00* (2013.01); *B01J 12/002* (2013.01); *B01J 19/12* (2013.01); *B01J 37/34* (2013.01); *B01J 37/341* (2013.01); *B01J 37/349* (2013.01); *B01J 2219/00635* (2013.01); *B01J 2219/0807* (2013.01); *B01J 2219/0875* (2013.01);
  (Continued)

(58) Field of Classification Search
  None
  See application file for complete search history.

(56) References Cited

U.S. PATENT DOCUMENTS 4,039,023 A 8/1977 McClaine
4,183,369 A 1/1980 Thomas
(Continued)

FOREIGN PATENT DOCUMENTS

CN 2582231 Y 10/2003
EP 5302988 A 6/1991
(Continued)

OTHER PUBLICATIONS

USPTO, non-Final Office Action in U.S. Appl. No. 15/891,416 dated Feb. 13, 2020.
(Continued)

*Primary Examiner* — Kishor Mayekar
(74) *Attorney, Agent, or Firm* — NK Patent Law

(57) ABSTRACT

An exothermic reaction assembly includes a reaction chamber and a generator operative to generate an AC electrical signal and apply the signal to the reaction chamber by superimposing the AC signal over a DC signal. A gas manifold and controller is operative to connect a vacuum pump and one or more gas chambers to the reaction chamber and to control a pressure of the reaction chamber. The signal generator is operative to create a plasma in the reaction chamber by superimposing the AC electrical signal to the reaction chamber over the DC signal. The gas manifold and controller are operative to adjust the pressure within the reaction chamber to achieve a predetermined plasma frequency.

23 Claims, 5 Drawing Sheets

Related U.S. Application Data

(60) Provisional application No. 62/346,184, filed on Jun. 6, 2016.

(51) Int. Cl.
 *G21B 3/00* (2006.01)
 *C25D 5/10* (2006.01)
 *B01J 12/00* (2006.01)
 *B01J 19/12* (2006.01)
 *B01J 37/34* (2006.01)

(52) U.S. Cl.
 CPC ............... *B01J 2219/0894* (2013.01); *B01J 2219/0896* (2013.01); *B01J 2219/0898* (2013.01)

(56) References Cited

U.S. PATENT DOCUMENTS

| | | | |
|---|---|---|---|
| 4,487,670 | A | 12/1984 | Bellanger et al. |
| 5,384,147 | A | 1/1995 | Hilpert |
| 6,068,683 | A | 5/2000 | Carnes et al. |
| 6,623,976 | B1 | 9/2003 | Hale et al. |
| 7,452,449 | B2 | 11/2008 | Neinberg et al. |
| 9,115,913 | B1 | 8/2015 | Rossi |
| 2002/0028176 | A1 | 3/2002 | Nakamura |
| 2003/0053579 | A1 | 3/2003 | Waisman et al. |
| 2005/0236376 | A1 | 10/2005 | Eccles |
| 2006/0088138 | A1 | 4/2006 | Jouanneau |
| 2007/0064857 | A1 | 3/2007 | Winterberg |
| 2007/0202035 | A1 | 8/2007 | Walsdorff et al. |
| 2009/0052603 | A1 | 2/2009 | Ikegami |
| 2009/0090022 | A1 | 4/2009 | Ho et al. |
| 2009/0155640 | A1 | 6/2009 | Cui et al. |
| 2009/0317310 | A1 | 12/2009 | Coates et al. |
| 2010/0135466 | A1 | 6/2010 | Steinlage et al. |
| 2011/0268236 | A1 | 11/2011 | Deluze |
| 2013/0243143 | A1 | 9/2013 | Mastromatteo et al. |
| 2015/0187444 | A1 | 7/2015 | Godes |
| 2015/0371723 | A1 | 12/2015 | Godes et al. |
| 2015/0377807 | A1 | 12/2015 | Grass |
| 2015/0380113 | A1 | 12/2015 | Wong et al. |
| 2016/0155518 | A1 | 6/2016 | Mizuno |
| 2016/0194766 | A1 | 7/2016 | Eastman et al. |
| 2017/0036971 | A1 | 2/2017 | Hershkowitz et al. |
| 2017/0117066 | A1 | 4/2017 | Swartz et al. |
| 2017/0301409 | A1 | 10/2017 | Vandrie et al. |
| 2017/0323692 | A1 | 11/2017 | Hubler et al. |
| 2017/0372801 | A1 | 12/2017 | Wong |
| 2018/0068744 | A1* | 3/2018 | Wong ............... G21B 1/05 |
| 2018/0087165 | A1 | 3/2018 | Alcaraz et al. |
| 2018/0374587 | A1 | 12/2018 | Letts et al. |

FOREIGN PATENT DOCUMENTS

| | | | |
|---|---|---|---|
| GB | 1503850 | | 7/1976 |
| JP | 04-312565 | | 4/1994 |
| JP | 06-160560 | * | 6/1994 |
| JP | H0773875 | A | 3/1995 |
| KR | 20130047289 | A | 5/2013 |
| RU | 2489210 | C1 | 8/2013 |
| WO | 9428197 | A2 | 12/1994 |
| WO | 9521447 | A1 | 8/1995 |
| WO | 2008060275 | A2 | 5/2008 |
| WO | 2017176334 | A2 | 10/2017 |

OTHER PUBLICATIONS

PCT, International Search Report and Written Opinion in International Application No. PCT/US17/13931 dated Aug. 22, 2017.
EPO, Extended European Search Report in European Patent Application No. 17741846.4 dated Jun. 24, 2019.
PCT, International Search Report and Written Opinion in International Application No. PCT/US2018/019616 dated Nov. 26, 2018.
Strobel, R., et al, Hydrogen adsorption on carbon materials, Journal of Power Sources, 1999, pp. 221-224, vol. 84.
Chahine, R., et al., Low-Pressure Adsorption Storage of Hydrogen, International Journal of Hydrogen Energy, 1994, pp. 161-164, vol. 19, No. 2.
USPTO, non-Final Office Action in U.S. Appl. No. 15/617,364 dated Dec. 18, 2018.
PCT, International Search Report and Written Opinion in International Application No. PCT/US2018/019623 dated Mar. 7, 2019.
PCT, International Search Report and Written Opinion in International Application No. PCT/US2018/019625 dated Mar. 7, 2019.
USPTO, Final Office Action in U.S. Appl. No. 15/617,347 dated Mar. 5, 2019.
USPTO, non-Final Office Action in U.S. Appl. No. 15/683,208 dated May 23, 2019.
USPTO, Notice of Allowance in U.S. Appl. No. 15/617,347 dated Jan. 28, 2019.
USPTO, non-Final Office Action in U.S. Appl. No. 15/617,347 dated Apr. 3, 2019.
USPTO, Final Office Action in U.S. Appl. No. 16/361,825 dated Jan. 13, 2020.
USPTO, non-Final Rejection in U.S. Appl. No. 16/361,825 dated Aug. 14, 2019.
PCT, International Preliminary Report on Patentability in International application No. PCT/US2018/024790 dated Oct. 1, 2019.
PCT, International Search Report and Written Opinion in International application No. PCT/US2018/019617 dated Feb. 7, 2019.
PCT, International Search Report and Written Opinion in International application No. PCT/US2018/024790 dated Jul. 17, 2018.
Mewes, et al, Bose-Einstein Condensation in a Tightly Confining dc Magnetic Trap, Physical Review Letters, Jul. 15, 1996, pp. 416-419, vol. 77, No. 3.
Kim, Yeong E., Theory of Bose—Einstein condensation mechanism for deuteron-induced nuclear reactions in micro/nano-scale metal grains and particles, Naturwissenchaften, 2009, pp. 803-811, vol. 96, Springer-Verlag.
Kim, Yeong E., Theoretical Analysis and Reaction Mechanisms for Experimental Results of Deuterium-Metal and Hydrogen-Lithium-Nickel Systems, Purdue Nuclear and Many-Body Theory Group (PNMBTG), Sep. 2015, pp. 1-13.
USPTO, non-Final Rejection in U.S. Appl. No. 15/615,167 dated Mar. 12, 2019.
USPTO, non-Final Rejection in U.S. Appl. No. 15/891,416 dated Feb. 13, 2020.
Federal Institute of Industrial Property (FIPS), Search Report in Russian Application No. 2018120536/07(032375) dated May 13, 2020.
Russian Patent Office, Office Action in Russian Application No. 2018120536/07(032375) dated May 20, 2020.
Bogdanova, L.N., et al., In search of perpetuum mobile, "In defense of science", Bulletin No. 11, pp. 12-20.

* cited by examiner

PLASMA FREQUENCY TRIGGER

CROSS-REFERENCE TO RELATED APPLICATION

This application is a divisional of U.S. patent application Ser. No. 15/615,167, titled "PLASMA FREQUENCY TRIGGER" filed on Jun. 6, 2017, which claims the benefit of priority of U.S. Provisional Patent Application No. 62/346,184, titled "PLASMA FREQUENCY TRIGGER" filed on Jun. 6, 2016, which are incorporated herein in their entirety by this reference.

FIELD OF INVENTION

The present invention relates generally to exothermic reactions, and in particular to triggering exothermic reactions by plasma excitation at certain optical phonon mode frequencies.

BACKGROUND

The generation of anomalous heat from hydrogen and/or deuterium loaded in metals or alloys has been an ongoing topic of research for over 25 years. However, the mechanisms of, and triggers for, such exothermic reactions are not fully known. Devising a reliable triggering mechanism for exothermic reactions, to generate excess heat in a metal or alloy loaded with hydrogen/deuterium, stands as a major challenge in this field of research.

In the early 2000s, the present inventor triggered exothermic reactions by exciting a metal occluded with deuterium and natural abundance hydrogen with visible laser light. These experiments are detailed in published US Patent Application No. 2004/0173462, the disclosure of which is incorporated herein by reference in its entirety. Briefly, a metal electrode capable of absorbing hydrogen (e.g., palladium) was prepared by cold working, etching, polishing, cleaning and annealing, to increase the average grain size of the lattice and introduce dislocations to the lattice structure. After undergoing electrolysis in a solution of heavy water and acid or salts to load the electrode with hydrogen/deuterium, gold was plated onto the electrode. The electrode was then illuminated with a tunable laser beam focused to a narrow spot, with the frequency of the laser being adjusted. At certain laser frequencies, excess heat may be generated at a power density many times greater than that achievable in fuel cells. In one experiment, laser beams of two different frequencies were focused to the same spot, generating anomalous heat.

Recent research in exothermic reactions has utilized a sealed, metal reaction chamber, evacuated to a vacuum and into which controlled quantities of hydrogen/deuterium gas are introduced. The hydrogen/deuterium molecules in a plasma are accelerated to a hydrogen-absorbing metal or alloy plated onto an electrode or the (grounded) interior surface of the chamber wall (acting as a cathode). Because the reaction chamber is opaque, laser light cannot easily be used to trigger exothermic reactions in the hydrogen/deuterium-loaded metal.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, an exothermic reaction of hydrogen/deuterium loaded into a metal or alloy is triggered by controlling the frequency of a plasma. In a plasma, charged particles oscillate at certain frequencies, which are referred to as plasma frequencies in this disclosure. The plasma frequency is controlled by adjusting the electron density of the plasma. The plasma frequency is in turn controlled by adjusting the pressure within the reaction chamber. An exothermic reaction is generated at certain discrete plasma frequencies, which correspond to the optical phonon modes of D-D, H-D, and H-H bonds within the metal lattice. For example, in palladium metal, the frequencies are 8.5 THz, 15 THz, and 20 THz, respectively.

One embodiment relates to a method of triggering an exothermic reaction in a sealed reaction chamber including an anode and a cathode having a reactive metal coating. The reaction chamber is evacuated to a predetermined vacuum. One or both of hydrogen (H) and deuterium (D) gas are introduced into the reaction chamber at predetermined partial pressures. A plasma is created in the reaction chamber by applying a high voltage DC electrical signal to the anode. The electron density in the plasma is adjusted to achieve a predetermined plasma frequency by controlling the pressure within the reaction chamber. An exothermic reaction is triggered by achieving a plasma frequency of a predetermined value.

Another embodiment relates to an exothermic reaction assembly. The assembly includes a reaction chamber including a sealed metallic housing grounded to function as a cathode; a reactive metal coating on the interior surface of the housing; and an anode suspended within the chamber. The assembly also includes a signal generator V operative to generate a high frequency, high voltage electrical signal and apply the signal to the anode or alternatively to the cathode. The assembly further includes a gas manifold and controller, referenced together as 114 in the drawings, operative to connect a vacuum pump and one or more gas chambers to the reaction chamber and to control the mass and pressure of gases in the chamber. The signal generator V is operative to create a plasma in the reaction chamber by applying an AC electrical signal superimposed over a high voltage DC signal to the anode or alternatively to the cathode. The gas manifold and controller 114 are operative to adjust the electron density in the plasma to achieve a predetermined plasma frequency by controlling the pressure within the reaction chamber.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
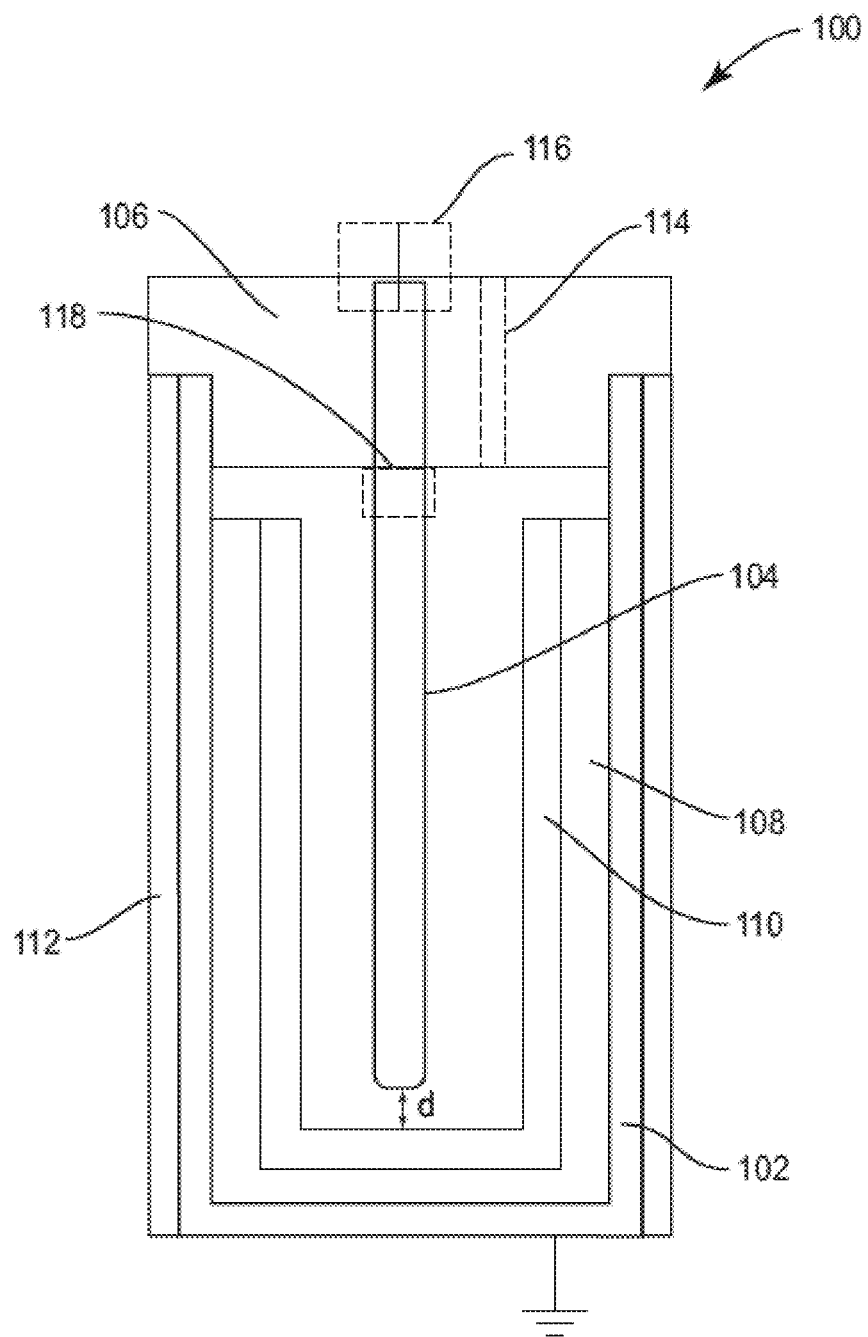
FIG. 1 is a functional section diagram of an exothermic reaction chamber according to one embodiment.

FIG. 1 is a functional section diagram of some parts of a reaction chamber 100 for triggering and housing an exothermic reaction. The chamber 100 includes a metal container 102, an electrode 104, and a lid 106. The metal container 102 is made of a material that does not react with or absorb hydrogen. In one embodiment, the metal container 102 is made of stainless steel, for example, grade 316L. The wall of the metal container 102 should be thick enough to withstand plating, high pressure, high temperature, etc. For instance, in one embodiment, the thickness of the wall of the metal container 102 is larger than 1/16 in. Other dimensions may work as well. In some embodiments, the metal container 102 is in the form of a tube and is of a cylindrical shape. The diameter of the cylinder may be between 0.8 and 1 in. For example, in one embodiment, the outer diameter of the cylinder is 1 inch and the inner diameter of the cylinder is 0.875 in. The length of the tube in one embodiment is approximately 12 in. In general, there is no restriction on the length or the size of the tube. The size of the tube determines how much hydrogen absorbing material can be plated inside the reactor. The amount of heat produced is directly proportional to the amount of hydrogen absorbing material plated inside the reactor. The forms or shapes of the container are chosen mainly for the convenience of manufacturing and ease of operation. For instance, the metal container 102 can be made of a rectangular shape.

The metal container 102 may have one or more open ends. In FIG. 1, the metal container 102 is shown to have only one open end. In some embodiments, the metal container 102 can have two or more open ends. At least one open end is required to be removable or changeable in order to accommodate the electrode 104, input/output ports referenced together with the gas manifold and controller as 114 in FIG. 2, and electric cords or cables 116.

The electrode 104, as shown in FIG. 1, is received through one open end into the metal container 102. In some embodiments, the electrode 104 is placed in the center of the metal container 102, equidistant from the sidewalls of the metal container 102. The electrode 104 may be made of tungsten, molybdenum, cobalt, or nickel, or other rugged metal that can withstand high voltage and high temperature environments.

In some embodiments, the electrode 104 is made of the same shape as the metal container 102, to create a uniform electric field inside the metal container 102. The electrode 104 is shaped as a rod with a diameter of 1/16 in. The metal container 102 is in the shape of a tube with an outer diameter of one inch and an inner diameter of 0.875 in. The length of the metal container 102 is 12 in and the electrode 104 extends into the metal container 102. The distance between the end of the electrode 104 and the bottom of the metal container 102 (d in FIG. 1) is preferably 0.6 in.

The component 116 is a removable electrical pass-through. The component 116 holds the electrode 104 in place at the center of the metal container 102. The component 116 is preferably made of ceramic, but can be of any electrically insulating material. The component 116 uses a safe high voltage connector to connect the electrode 104 to a high voltage power supply. A lid made of aluminum is placed over the electrical pass-through to provide accommodation for pressure controlling devices 114 for removing or supplying gas to the metal container 102 and for monitoring gas pressure inside the metal container 102. In another embodiment, the lid may be made of stainless steel or any other suitable metal.

To prepare the device 100 for exothermic reactions, the first step is to provide a hydrogen absorbing material to occlude hydrogen or deuterium. In a preferred embodiment, the hydrogen absorbing material 110 is plated either on the interior of the metal container 102 or on the electrode 104. Well known hydrogen absorbing materials include palladium, nickel, titanium, and other metals and alloys known to form hydrides or deuterides. In some embodiments, palladium or palladium alloy or a palladium product is used as the hydrogen absorbing material and is plated on the interior wall of the metal container via an electrolytic process. In one embodiment, the thickness of the plating is around 7 microns. On a macro scale, the thickness of the plating is uniform across the sidewalls and the bottom of the metal container 102. However, in a preferred embodiment, the surface of the plated hydrogen absorbing material is made rough on a micro scale, by performing the plating procedure at a high current to force rough deposits.

In some embodiments, a layer of gold 108 is plated underneath the hydrogen absorbing material 110. In one embodiment, the thickness of the layer 108 is approximately 10 microns and is uniform across the sidewalls and the bottom of the metal container 102 on a macro scale. As with the hydrogen absorbing material 110, the layer of gold 108 is preferably rough, achieved by using a strong current in the electrolysis process. The layer of gold 108 functions as a seal to maintain high loading in the hydrogen absorbing material and may serve other functions such as providing an interface between the container and the hydrogen absorbing material. Other metals, such as silver, that do not absorb hydrogen may be used instead of gold.

In some embodiments, when electrolysis is used as the plating method, the plating of the hydrogen absorbing material 110 and gold 108 generally covers the sidewalls and the bottom of the metal container 102 except a strip near the top of the metal container. This strip exposes the metal container to the high voltage differential applied between the metal container 102 and the electrode 104. To prevent sparking between the electrode 104 and the metal container 102 when a high voltage is applied, the portion of the electrode 104 that is parallel to the exposed area of the metal container is coated with an insulator 118, for example, Teflon.

Figure 2:
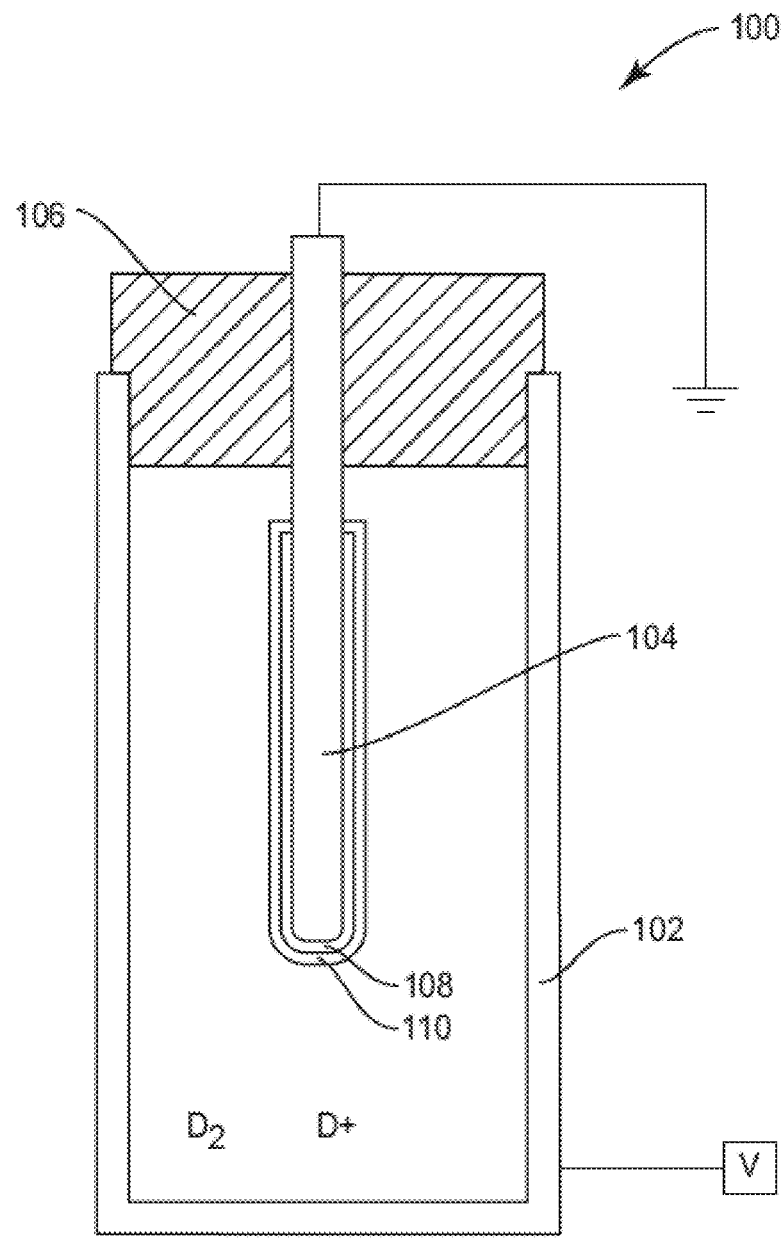
FIG. 2 is a functional section diagram an exothermic reaction chamber according to another embodiment.

In the reaction chamber 100 shown in FIG. 1, the hydrogen absorbing material 110 and the layer of gold 108 are plated on the interior walls of the metal container. In some embodiments, the hydrogen absorbing material can be plated on the electrode 104 as shown in FIG. 2. It is easier to plate the hydrogen absorbing material on the electrode 104 than inside the interior wall of the metal container. Additionally, the electrode 104 can be easily taken out and replaced with new test samples. In some embodiments, the electrode 104 is first plated with a non-hydrogen absorbing material 108, e.g., gold. The hydrogen absorbing material 110 is then plated on top of the non-hydrogen absorbing material 108. In FIG. 2, the electrode 104 is grounded. A signal generator represented as a power supply V in FIG. 2 is connected to the metal container 102 to provide a voltage differential between the metal container 102 and the electrode 104. The voltage differential may be set at a predetermined value. Experiments show that certain voltage values are optimal in triggering exothermic reactions and the optimal voltage values correlate to the geometry of the reactor 100. The electrode containing the hydrogen-absorbing material is always run as the negative electrode (cathode).

Both FIG. 1 and FIG. 2 show that one of the electrodes is grounded. However in some embodiments, neither electrode may be grounded, i.e., the reactor can be made "floating," although for safety considerations grounding is preferred. For convenience and without loss of generality, embodiments of the present invention will be described with respect to the reaction chamber 100 of FIG. 1, with the metal container 102 grounded.

A high-frequency AC electrical signal is superimposed over a high voltage DC signal and applied to the electrode (anode) 104, or alternatively to the cathode 102. The deuterium gas in the container is ionic, and the DC anode signal causes a plasma conducting current from the anode 104 to the container wall 102, accelerating deuterium ions toward the hydrogen absorbing material 110 plated onto the container wall 102. The velocity achieved by a deuterium ion is determined by the mean free path of the deuterium ion. The deuterium ion velocity in turn determines the wavelength of the Debroglie pilot wave associated with the deuterium ion. When the Debroglie pilot wave corresponds to one of the resonant modes of a confinement space, the wavelength of the Debroglie pilot wave and the size of the confinement space have a fixed relationship. From the size of the confinement space, the wavelength(s) of the Debroglie pilot wave of a resonant deuterium ion can be determined. Experiments show that an exothermic reaction among deuterium ions in resonant states is possible and maybe initiated under certain triggering conditions.

In a metal hydride, there may be several relevant confinement dimensions. For example, the average separation distance between two deuterium atoms in a deuterium gas molecule is 0.741 Angstroms. The average separation distance between two deuterons in a D2 molecular ion is 1.058 Angstroms. The lattice dimension for deuterated palladium in the beta phase is 4.026 Angstroms and the size of a palladium vacancy is conjectured to be one half this value, or 2.013 Angstroms. There is experimental evidence suggesting that D-D exothermic reactions are possible in the vacancies of certain metal deuterides, most notably palladium.

The laser light triggers described in 2004/0173462 further indicate that excitation of H-H, H-D, and D-D molecules in the hydrogen absorbing material 110 at optical phonon modes of these bonds is also a trigger for exothermic reactions. For example, one result described in the '462 publication is an exothermic reaction that is triggered (or at least intensified) by the simultaneous irradiation of a metal electrode by two laser beams of different optical frequencies. It is hypothesized that the beat frequency between these two beams matches one of the characteristic optical phonon mode frequencies: 8.5 THz, 15.5 THz, and 20.5 THz for D and H confinement in a 4.026 Angstrom lattice, and 16 THz, 30 THz, and 40 THz for D and H confinement in a 2.013 Angstrom vacancy.

According to embodiments of the present invention, the frequency of the plasma within the reaction chamber 100 is controlled to resonate at one of these characteristic frequencies. The oscillation frequency of the charged species in a plasma is given by:

$$f = \frac{1}{2\pi}\sqrt{\frac{4\pi N_e q^2}{M_e \varepsilon_0}}, \text{ where} \tag{1}$$

The only controllable variable in the plasma frequency equation (1) is $N_e$, the electron density. The electron density of a plasma can be controlled by controlling the pressure and temperature of the plasma to produce a specific desired plasma frequency. It is contemplated that when the plasma frequency is set equal to one of the optical phonon modes for the deuterated material inside the metallic vessel, an exothermic reaction can be triggered in the deuterated material.

The known plasma physics equations can be manipulated to reveal the desired pressure inside the vessel for producing the frequencies that match the optical phonon frequencies of the deuterated material (typically palladium deuteride), at a given temperature, as shown in Equation (2) below.

$$P = F^2 \pi M_e \varepsilon_p \frac{R_G T_G}{N_A q^2} \text{ where} \tag{2}$$

P=pressure
F=desired frequency [THz]
$M_e$=electron mass
$\varepsilon_p$=vacuum permittivity
$R_G$=molar gas constant
$T_G$=gas temperature
$N_A$=Avogadro's constant and
q=charge of the electron Note that $T_G$, the gas temperature, is a variable in equation (2). It is anticipated that, as exothermic reactions are reliably triggered and sustained in a reaction chamber 100, $T_G$ may change, requiring an adjustment to the pressure to maintain the desired plasma frequency.

Figure 3:
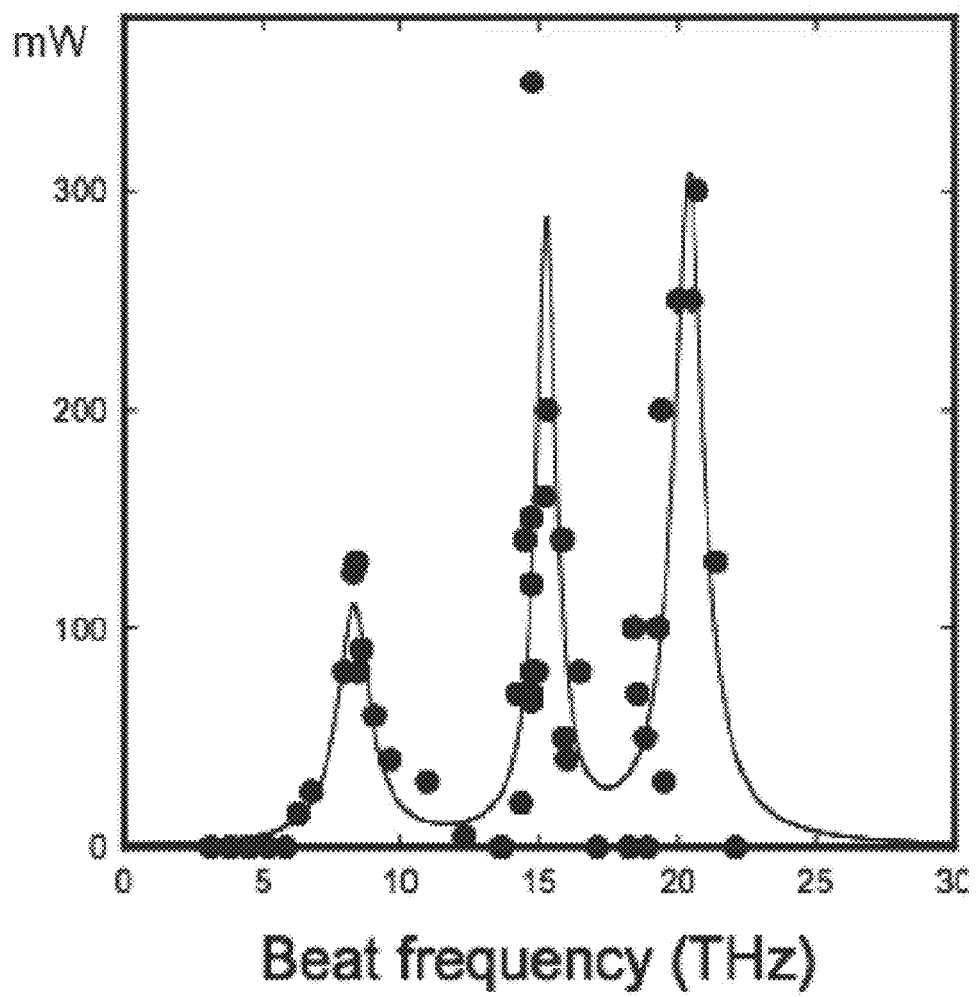
FIG. 3 is a graph depicting exothermic reaction outputs vs. beat frequency of optical excitation lasers.

In a deuterated metal, there are three types of principal bonds, D-D, D-H, and H-H. The three plasma frequencies corresponding to these three types of principal bonds are 8.5 THz, 15.5 THz, and 20.5 THz, if the hydrogen or deuterium confinement is on a 4.026 Angstroms palladium lattice. If the confinement is in a palladium vacancy of 2.013 Angstroms, then the vibrational frequency is almost doubled. Triggering frequencies of approximately 8.5 THz, 15.5 THz, and 20.5 THz were observed in more than forty dual laser experiments in 2007-2008 as shown in FIG. 3. In this figure, three optical excitation (beat) frequencies resulted in anomalous heat generation: 8.3 THz, with a tolerance width of 0.70 THz; 15.3 THz with a width of 0.44 THz; and 20.4 THz with a width of 0.68 THz. Appendix A attached hereto describes these experiments.

Figure 4:
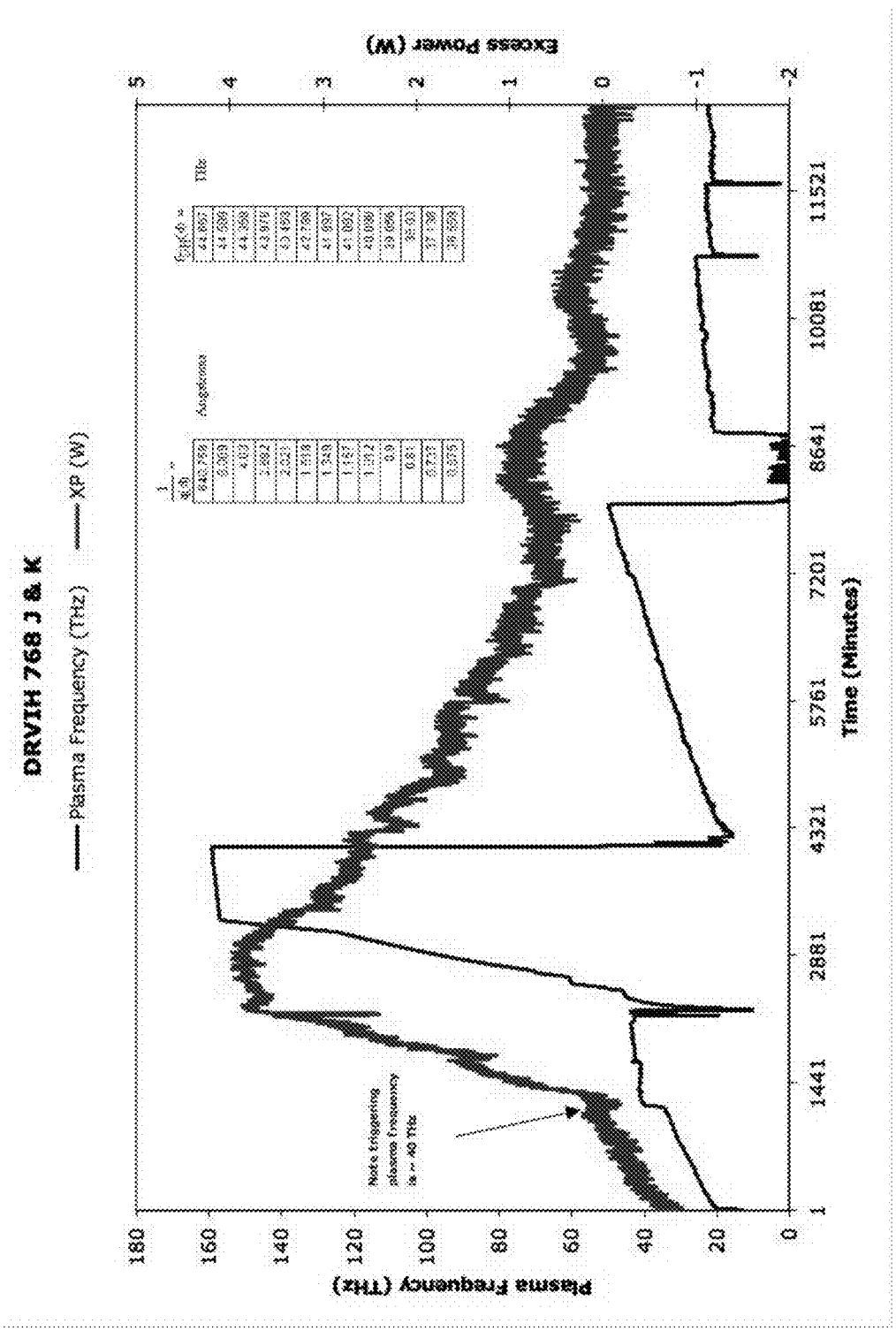
FIG. 4 is a graph plotting the output power of a reaction chamber and plasma frequency vs. time.

In 2015 a series of 50 experiments were conducted using a sealed metallic cylindrical vessel, similar to that depicted in FIG. 1. The plasma frequency method disclosed herein was tested on several occasions in 2015 and exothermic reactions were triggered in the 30-40 THz range as shown in FIG. 4. This implies that for these tests, the deuterium was confined in palladium vacancies with a dimension of approximately 2.013 Angstroms. The corresponding resonant frequencies would then be around 16, 30, or 40 THz. The result shown in FIG. 4 is consistent with stimulating the D-H bond in a palladium vacancy with a dimension of 2.013 Angstroms. Note in particular that as the plasma frequency reaches 40 THz, an exothermic reaction is triggered, with the power generated rapidly rising from 0 to 4 Watts.

Table 1 below depicts various values of the inverse propagation constant q in a hydrogen absorbing material 110, and the associated optical phonon mode frequency. Inverse q is defined as wavelength/2 Pi. When inverse q is approximately equal to a lattice confinement dimension such as 2.013 Angstroms, excess power may be triggered in a deuterated metal. Table 1 shows that one of the expected triggering frequencies is approximately 43.453 THz.

TABLE 1

Inverse Propagation Constant and optical phonon mode frequency

| $\frac{1}{q_d}$ Angstroms | $f_{DH}$ (d) THz |
|---|---|
| — | — |
| 4.03 | 44.358 |
| 2.692 | 43.978 |
| 2.021 | 43.453 |
| 1.618 | 42.789 |
| 1.349 | 41.997 |
| 1.157 | 41.092 |
| 1.012 | 40.098 |
| 0.9 | 39.056 |
| 0.81 | 38.03 |
| 0.737 | 37.138 |
| 0.675 | 36.559 |

Figure 5:
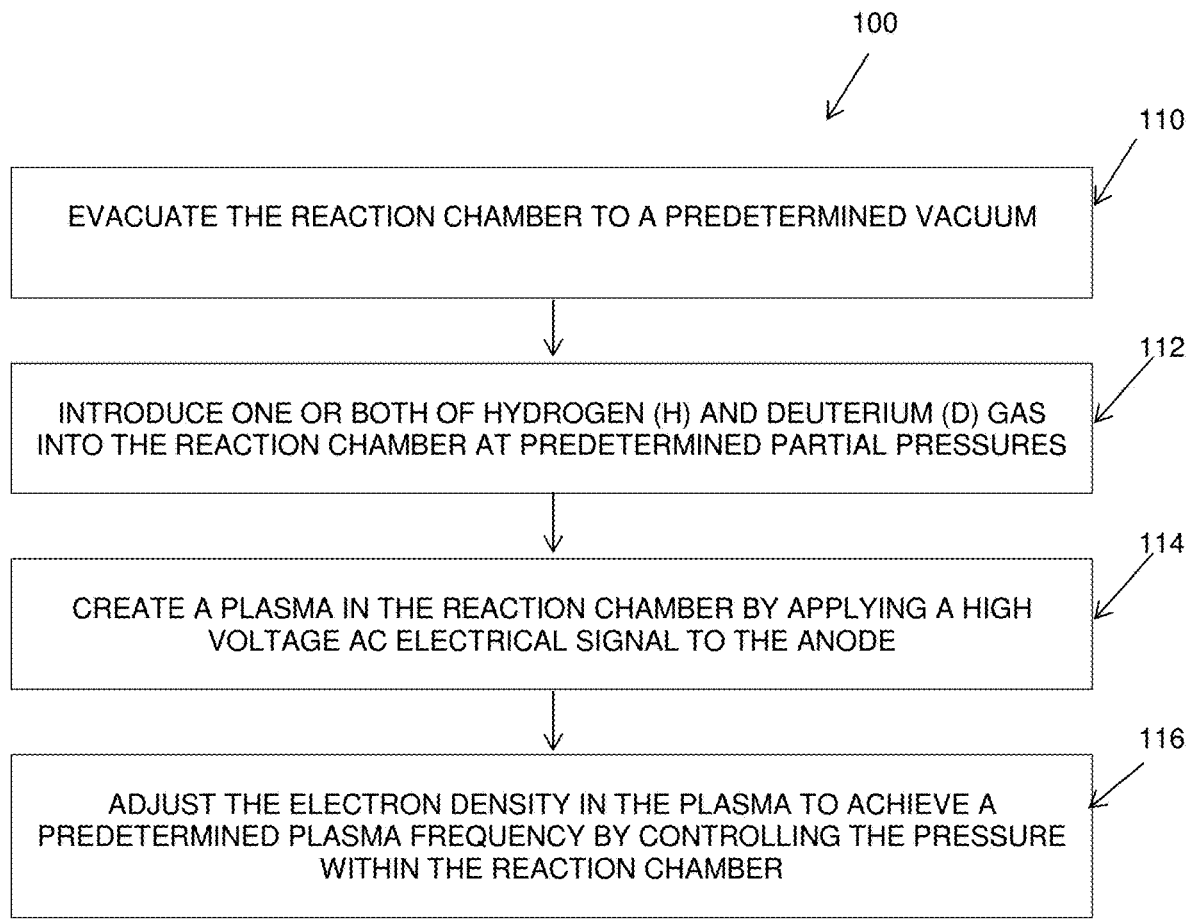
FIG. 5 is a flow chart illustrating an exemplary process for achieving a predetermined plasma frequency.

FIG. 5 depicts a method 500 of triggering an exothermic reaction in a sealed reaction chamber including an anode and a cathode having a reactive metal coating. The reaction chamber is evacuated to a predetermined vacuum (block 510). One or both of hydrogen (H) and dseuterium (D) gas are introduced into the reaction chamber at a predetermined partial pressure, as deduced from Equation (2) (block 512). A plasma is created in the reaction chamber by applying a high voltage DC electrical signal to the anode (block 514). The electron density in the plasma is adjusted, by controlling the pressure of the gas inside the reaction chamber, to achieve a predetermined plasma frequency (block 516). When the plasma frequency of the predetermined value is achieved inside the reaction chamber, an exothermic reaction of the D/H loaded into the reactive metal coating can be triggered.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims area intended to be embraced therein.

What is claimed is:

1. An exothermic reaction assembly comprising:
   a reaction chamber comprising:
     a sealed metallic housing having an interior surface;
     an electrode; and
     a reactive metal coating on the interior surface of the housing or the electrode;
   a signal generator operative to generate a signal comprising an AC electrical signal superimposed over a DC signal; and
   a gas manifold and controller operative to connect a vacuum pump and one or more gas chambers to the reaction chamber and to control a pressure of the reaction chamber;
   wherein the signal generator is operative to create a plasma in the reaction chamber by applying the generated signal to the reaction chamber; and
   wherein the gas manifold and controller are operative to adjust the pressure within the reaction chamber to achieve a predetermined plasma frequency.

2. The assembly of claim 1 wherein the reactive metal coating includes a hydrogen-absorbing metal or alloy.

3. The assembly of claim 2 wherein the hydrogen-absorbing metal or alloy is plated onto the interior surface of the housing or the electrode.

4. The assembly of claim 1 wherein the reactive metal coating includes a non-hydrogen absorbing material coating on the interior surface of the housing or the electrode.

5. The assembly of claim 4 wherein the non-hydrogen absorbing material includes gold.

6. The assembly of claim 1 wherein the interior surface of the housing is grounded.

7. The assembly of claim 1 wherein the electrode is composed of one of tungsten, molybdenum, cobalt, or nickel.

8. The assembly of claim 1 wherein the electrode is coated with a non-hydrogen absorbing material.

9. The assembly of claim 8 wherein the non-hydrogen absorbing material includes gold.

10. The assembly of claim 1 wherein the electrode is the same shape as the reaction chamber and creates a uniform electric field inside the reaction chamber.

11. The assembly of claim 1 wherein the electrode is insertable into and removable from the reaction chamber and wherein the electrode is placed in a center of the reaction chamber equidistant from the interior surface of the housing.

12. The assembly of claim 1 wherein a portion of the electrode is parallel to an exposed area of the interior surface of the housing, wherein the portion of the electrode is coated with an insulator such that sparking is prevented between the electrode and the interior surface of the housing when a high voltage is applied.

13. The assembly of claim 1 wherein the insulator includes Teflon.

14. The assembly of claim 1 wherein the interior surface of the housing acts as a cathode.

15. The assembly of claim 14 wherein the signal generator is configured to apply a high frequency, high voltage electrical signal to the cathode.

16. The assembly of claim 14 wherein the one or more gas chambers contain one or both of hydrogen (H) and deuterium (D) gas.

17. The assembly of claim 1 wherein one or both of the hydrogen (H) or the deuterium (D) gas are introduced into the reaction chamber at predetermined partial pressures.

18. The assembly of claim 1 wherein the reaction chamber prevents laser light from triggering an exothermic reaction in the reactive metal coating on the interior surface of the housing.

19. The assembly of claim 1 wherein an exothermic reaction is triggered when the predetermined plasma frequency is achieved.

20. The assembly of claim 1 wherein the reactive metal coating comprises a palladium coating.

21. The assembly of claim 1 wherein adjusting the pressure within the reaction chamber to achieve the predetermined plasma frequency includes adjusting an electron density in the plasma.

22. The assembly of claim 1 wherein the predetermined plasma frequency comprises a frequency selected from the group consisting of 8.5 THz, 15.5 THz, and 20.5 THz.

23. The assembly of claim 1 wherein the predetermined plasma frequency comprises a frequency selected from the group consisting of 16 THz, 30 THz, and 40 THz.

\* \* \* \* \*